(12) United States Patent
Kerr et al.

(10) Patent No.: US 8,883,005 B2
(45) Date of Patent: Nov. 11, 2014

(54) PORTABLE WATER TREATMENT DEVICE

(75) Inventors: Donald Fredrick Kerr, New Paltz, NY (US); Matthew Geho, New Paltz, NY (US); James E. Tripi, New Paltz, NY (US); Sylvester Taliferro, New Paltz, NY (US)

(73) Assignee: Biosand Bag Filter, LLC, New Paltz, NY (US)

( * ) Notice: Subject to any disclaimer, the term of this patent is extended or adjusted under 35 U.S.C. 154(b) by 398 days.

(21) Appl. No.: 12/447,843

(22) PCT Filed: Nov. 6, 2007

(86) PCT No.: PCT/US2007/083781
§ 371 (c)(1),
(2), (4) Date: Jul. 6, 2009

(87) PCT Pub. No.: WO2008/058129
PCT Pub. Date: May 15, 2008

(65) Prior Publication Data
US 2010/0065509 A1 Mar. 18, 2010

Related U.S. Application Data

(60) Provisional application No. 60/864,481, filed on Nov. 6, 2006.

(51) Int. Cl.
*B01D 24/12* (2006.01)
*C02F 1/00* (2006.01)
*C02F 103/00* (2006.01)
*C02F 103/06* (2006.01)

(52) U.S. Cl.
CPC ............... *C02F 1/001* (2013.01); *C02F 1/004* (2013.01); *C02F 2103/007* (2013.01); *C02F 2103/06* (2013.01); *C02F 2201/008* (2013.01); *C02F 2209/40* (2013.01)
USPC ........... 210/237; 210/238; 210/244; 210/246; 210/747.5; 210/416.3

(58) Field of Classification Search
CPC ................................. B01D 23/16; B01D 24/12
USPC .............. 210/170.01, 170.7, 170.1, 238, 265, 210/282, 416.3, 747
See application file for complete search history.

(56) References Cited

U.S. PATENT DOCUMENTS

| 3,016,146 | A |   | 1/1962 | Smith et al. |
| 3,744,639 | A | * | 7/1973 | Teeple et al. .................. 210/265 |
| 4,443,336 | A | * | 4/1984 | Bennethum ................... 210/238 |
| 4,800,018 | A |   | 1/1989 | Moser |
| 5,415,774 | A |   | 5/1995 | Cowan et al. |
| 5,618,413 | A | * | 4/1997 | Todd et al. .................... 210/151 |

(Continued)

OTHER PUBLICATIONS

International Search report and Written Opinion for PCT/US2013/029528, mailed Jun. 3, 2013, 12 pages.

*Primary Examiner* — Tony G Soohoo
*Assistant Examiner* — Peter Keyworth
(74) *Attorney, Agent, or Firm* — Swanson & Bratschun, L.L.C.

(57) ABSTRACT

The present invention is uniquely engineered and provides water treatment devices for treatment of water in a small community or individual who are out of reach of access to safe water for domestic use, reach of adequate resources and reside in rural setting. Water treatment device of the invention are flexible, light weight and have high capacity.

14 Claims, 2 Drawing Sheets

(56) References Cited

U.S. PATENT DOCUMENTS

| | | | |
|---|---|---|---|
| 5,647,977 A * | 7/1997 | Arnaud | 210/167.3 |
| 6,875,350 B2 * | 4/2005 | Allard | 210/209 |
| 7,309,434 B2 * | 12/2007 | Potts | 210/605 |
| 2005/0035059 A1 * | 2/2005 | Zhang et al. | 210/605 |

* cited by examiner

PORTABLE WATER TREATMENT DEVICE

RELATED APPLICATIONS

This application is a 35 U.S.C. §371 national phase application of PCT/US07/83781, filed on Nov. 7, 2007, entitled "Portable Water Treatment Device", which application claims the benefit of U.S. Provisional Application Ser. No. 60/864,481, Filed Nov. 6, 2006, each of which are incorporated herein by reference in its entirety.

TECHNICAL FIELD

The invention generally relates to water treatment devices. More particularly, the invention relates to flexible, lightweight systems and devices for slow sand filtration and high capacity treatment of domestic water supplies that service users in smaller groups, for example in rural regions of the world.

BACKGROUND OF THE INVENTION

Water is a basic ingredient of life. In animals, water supports the digestion of food, transportation and use of nutrients and the elimination of toxins and waste from the body. It is estimated that each person requires a total consumption (i.e. drinking and food stuff preparation) of about 7.50 liters per day (Guy, 2003). This is considered a basic minimum amount of water required per person per day, although a much greater amount is typically consumed.

People throughout the world depend on having safe domestic water supplies. As of the year 2000 it was estimated that at least 1.1 billion people lacked access to safe water, representing about $1/6^{th}$ of world's population. Lack of a safe domestic water supply is particularly prevalent in rural areas of Asia and Africa (WHO/Unicef 2000) where water is either extremely limited or unsafe to consume without additional treatment measures.

Domestic water typically includes water used for household purposes such as consumption, food preparation, bathing, washing of clothes and dishes, flushing of toilets, vehicle washing, and lawn and garden irrigation. Domestic water use is typically divided into internal household use (bathing, flushing toilets, laundry, cleaning, and cooking); and external household use (lawn and garden irrigation, vehicle washing, and recreational use, i.e., pools, fountains, etc). In rural communities where safe domestic water supply is typically limited, external household use may be discontinued or simply supplied by climatic conditions, i.e., rain and/or snow.

Where internal domestic water is supplied from non-piped sources, an average of 6.60 liters of water is used for washing dishes and clothes and 7.30 liters of water per capita for bathing. By contrast, households having piped water supply show an average use of 16.30 liters of water per capita per day, expected for the same washing and bathing use. This difference in water use illustrates a basic need that communities, which rely on non-piped water, have in obtaining additional or adjuvant safe water supplies. This difference in access to safe water is at least partially responsible for the lower standard of health that afflicts many households having unpiped water sources, i.e., typically rural and/or remote access areas.

Water use can be categorized as "no access, basic access, intermediate access and optimal access." Within the population served at a basic access level, public health gains are primarily achieved through providing a protected water source(s), promoting good water handling hygiene practices and household treatment of water and other key hygiene behaviors at critical times. Table 1 shows service level categories for comparison with data concerning estimates of present level of coverage by service level. Data indicates that there remains a significant proportion of the world's population, 18%, without access to an improved water supply within one kilometer of their dwelling and that 53% do not have access to an intermediate access level of service (Guy 2003). Given the cost and difficulty in establishing safe water supplies for a community, especially a rural community in a developing country, these service levels would appear to be difficult to overcome.

TABLE 1

Categorization of Service levels

| Service Level | Access Measure | Needs met | Level of health concern |
| --- | --- | --- | --- |
| No access (quantity collected often below 5 l/c/d) | More than 1000 m or 30 minutes total collection time | Consumption - Cannot be assured<br>Hygiene - Not possible (unless practiced at source) | Very high. Hygiene not assured and consumption needs may be at risk. Quality difficult to assure; emphasis on effective use and water handling hygiene |
| Basic access (average quantity unlikely to exceed 20 l/c/d) | Between 100 and 1000 m or 5 to 30 minutes total collection time | Consumption - Should be assured<br>Hygiene - Hand washing and basic food hygiene possible; laundry/bathing - difficult unless carried out at source | Medium. Not all requirements may be met. Quality difficult to assure |
| Intermediate access (average quantity about 50 l/c/d) | Water delivered through one tap on-plot (or within 100 m or 5 minute total collection time) | Consumption - Assured<br>Hygiene - all basic personal and food hygiene assured; laundry and bathing - Should also be assured | Low. Most basic hygiene and consumption needs met. Bathing and laundry possible on-site, which may increase frequency of laundering. Issues of effective use still important. Quality more readily assured. |
| Optimal access (average quantity 100 l/c/d and above) | Water supplied through multiple taps continuously | Consumption - all needs met<br>Hygiene - All needs should be met | Very low. All use can be met, quality readily assured. |

The estimated quantities of water at each service level may reduce where water supplies are intermittent and the risk of ingress of contaminated water into domestic water supplies will increase. Where optimal access is achieved, but the supply is intermittent, a further health risk may result from the compromised functioning of waterborne sanitation systems.

Diseases caused by ingestion of water contaminated by human or animal excrement, which contain pathogenic microorganisms, are categorized belonging to water-borne diseases (see Table 2). Water borne diseases mainly include cholera, typhoid, amoebic and bacillary dysentery and other diarrheal diseases. In addition, water-borne disease can be caused by the pollution of water with chemicals that have an adverse effect on health. However, diseases caused by the pollution of water by chemicals come under the emerging trend of additional water treatment needs.

Water-washed diseases are caused by poor personal hygiene, insufficient body washing and skin and eye contact with contaminated water. These include scabies, trachoma, typhus, and other flea, lice and tick-borne diseases.

Diseases caused by parasites found in intermediate organisms living in contaminated water belong under the group of water-based diseases. The main water-based diseases include Schistosomiasis and Dracunculiasis.

The main cause of Water-related diseases is insect vectors, especially mosquitoes, which breed or feed near contaminated water. The common water-related diseases include dengue, filariasis, malaria, onchocerciasis, trypanosomiasis and yellow fever.

TABLE 2

Diseases Related to Water (Yenisel Cruz):

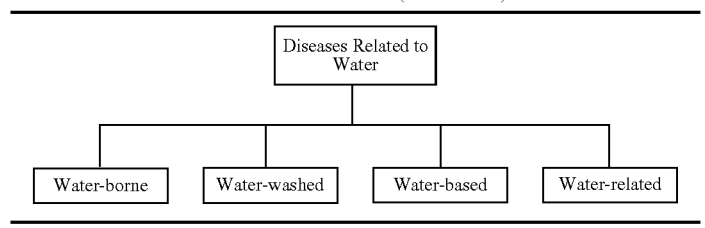

Lack of safe water is reported responsible for 80 percent of illnesses and deaths in developing world (Yenisei Cruz). Elsewhere across the globe, water borne diseases may be attributed as responsible for 80 percent of illness and deaths in the developing world.

A significant amount of disease can be prevented, especially in developing countries, through better access to safe water supply, adequate water treatment facilities and better hygiene practices.

Comparison of statistics indicates progress in rural water supply development in terms of percentage of population supplied with water (quantity), but there is some regression in urban water supply mainly because of population drift from rural to urban areas. It is estimated that domestic water use in developing countries will raise six folds over the coming four decades. The increase will place severe strains on surface and ground water supplies. Therefore, there is an increasing need to provide safe domestic water supplies, especially in developing and rural areas of the world.

The present invention is directed toward overcoming one or more of the problems and goals discussed above. The solutions provided by the present invention are particularly effective in relation to small and/or rural communities in need of local, safe water supplies.

Against this backdrop the present invention has been developed.

SUMMARY OF THE INVENTION

The present invention provides devices and methods for treatment of large volumes of water, and in particular for treatment of large volumes of water in rural and/or remote locations where either energy or transport access is limited.

In one embodiment, a device in accordance with the invention is provided having a flexible and light weight constraining member referred to herein as a flexible shell for constraint of a sufficient amount of filter material to gravity filter a sufficient amount of water to supply up to 50-70 persons in a community with up to about 5680 liters (1500 gallons) of treated water. In addition, the flexible shell is of a size and weight for easy transport to the location in need, and further for cost effective treatment of the water source.

Aspects of the invention include a single or double lined flexible shell having a first end for receipt of a water supply, a second end for release of a treated water supply, an internal chamber having an underdrain for support of a filter material, and a resealable access for access to the internal chamber. Embodiments herein include a structural member for support of the flexible shell. Attachment of the flexible shell to the support member can be with one or more durable straps or supports, and is typically performed with four or more durable straps.

Another embodiment of the invention provides methods for treating a water source in a remote or limited access area. Methods are directed at regions that have limited or no access to an energy supply or limited funds for use of an energy supply.

Aspects of the method include transport of a light weight water treatment device as described herein to a destination in need, support of the light weight water treatment device at the destination in need; loading of the water treatment device with a locally ascertainable filter material, for example sand; and treatment of the water source in the absence of energy need or input. In some aspects the treated water is stored for later use and can be further treated with chlorine or other like preventive antimicrobial material.

In some embodiments, from 3500 to 4500 pounds of filter material is loaded into embodiments of the water treatment device to treat up to 60 gallons of water per hour. Filter material can be sand or other comparable commercially available filter material, which provides equivalent water quality objectives.

These and various other features and advantages of the invention will be apparent from a reading of the following detailed description and a review of the appended claims.

Note that the FIGURE representing the treatment of present invention is subject to appropriate modifications and are illustrative in nature. Other embodiments are contemplated to be within the scope of the present invention.

DETAILED DESCRIPTION

The present invention provides a water treatment device having capacity for delivering safe domestic quality water to an individual, group of individuals or small community. Embodiments of the invention are particularly beneficial for individuals or clustered communities that lack the capacity to receive improved water, for example individuals and communities in rural environments, especially in rural environments in underdeveloped or developing regions of the world where energy consumption is a concern.

Aspects of the present invention include a flexible, lightweight and highly transportable water treatment device that has the capacity to treat large volumes of water over relatively short periods of time. For example, embodiments of the present invention are designed to treat a sufficient quantity of water for a community of 70 or less persons (i.e., 24 hour water treatment capacity of about 3500 liters). Surprisingly, embodiments of the present invention do not require chemical treatment or energy input and are therefore optimal for use in rural and undeveloped areas of the world.

In one embodiment, a flexible, high capacity and lightweight water treatment device is provided. The device has a size and weight amendable to transport via air, land or water as well as by hand to remote/rural areas. In particular, the water treatment devices of the invention are of an unexpected and surprising size and weight to allow for transport via the United Postal Service, Federal Express or other like courier service. The flexible and light weight nature of these water treatment device embodiments provides a large benefit for use in remote and/or inaccessible regions of the world where embodiments of the invention can be set-up in a short period of time, require no energy input, and treat large volumes of water.

Figure 1A:
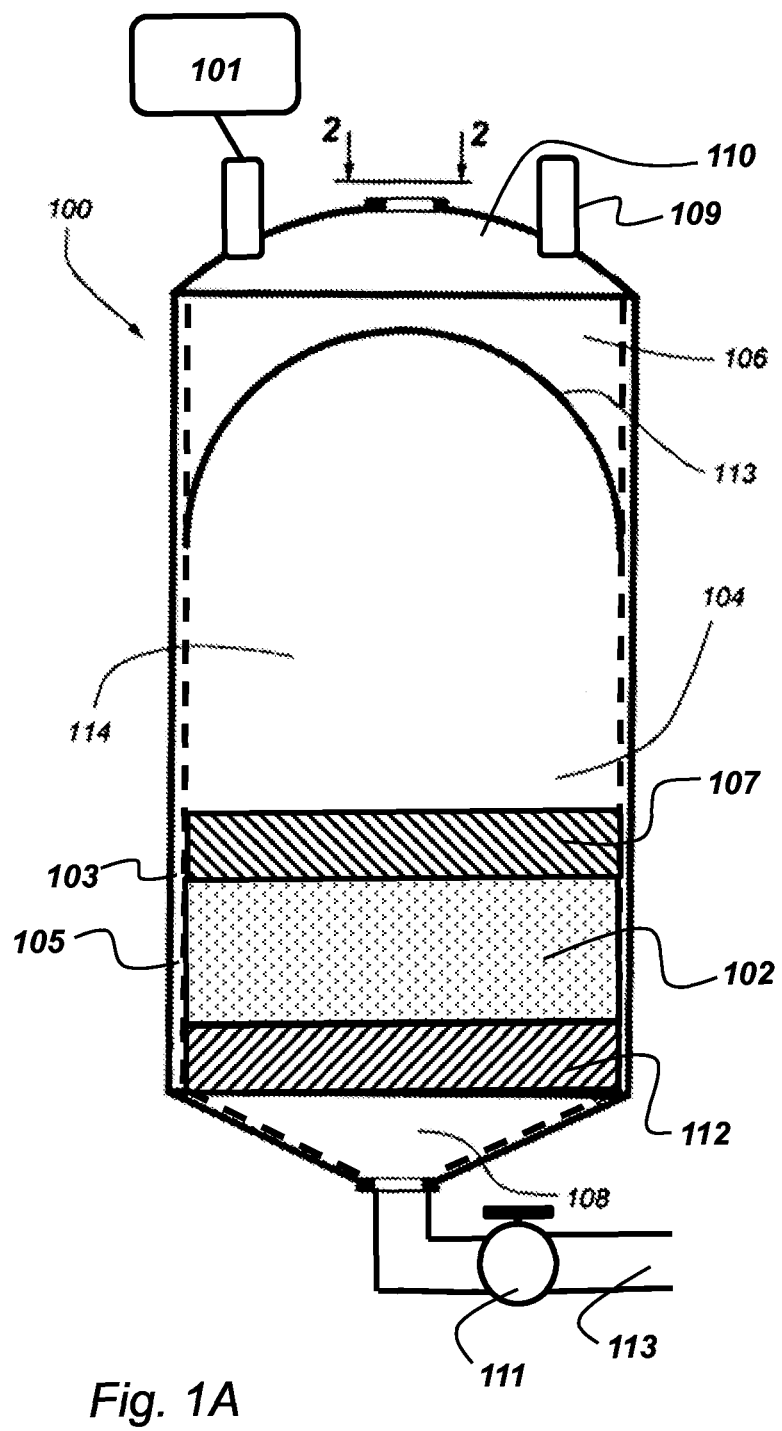
FIG. 1 provides a schematic of a flexible and portable embodiment of the water treatment device of the present invention.
FIG. 1B is Detail 2-2 shown in FIG. 1A.
FIG. 1C is Detail 3-3 shown in FIG. 1B.
Figure 1B:
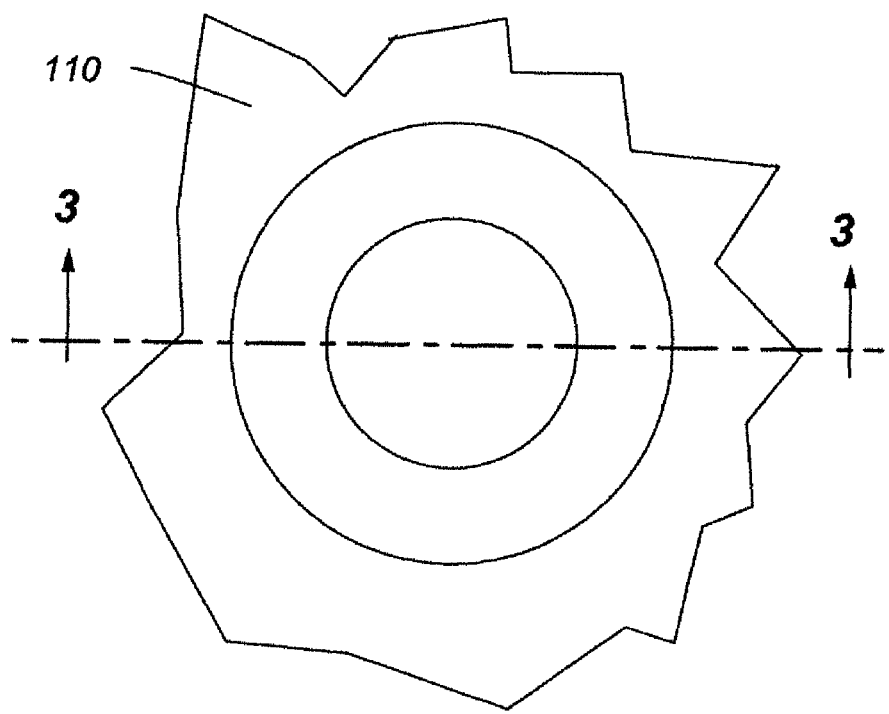
Figure 1C:
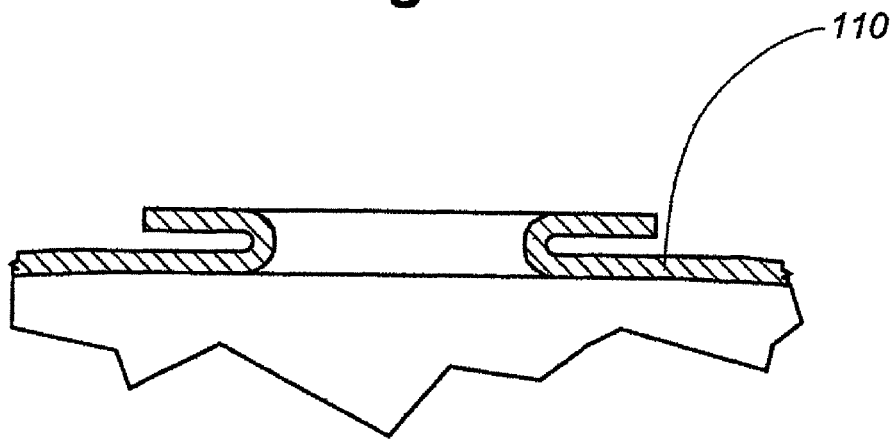

As shown in FIG. 1, an embodiment of a water treatment device 100 includes: a flexible, light weight shell 100 for enclosing and supporting a filter material 102 useful in treatment of a water source, and a structural member 101 for support of the flexible shell. The flexible shell 100 is sized and shaped to enclose and capture an appropriate amount of filter-based material as well as input water for filtration for a small group or community in need of about 5000-6000 liters of water a day, and more typically 5600 liters of water a day. In general, the flexible shell is constructed of one or more pieces of a material resistant to puncture or tearing. In typical aspects the material is also waterproof.

Structural members herein refer to members designed to support the flexible shell at a predetermined height off of the ground so as to allow for efficient filtration of the water source through the enclosed filter material (as if further described below). In general, the flexible shell is attached to the structural member(s) to optimize the force of gravity on the treatment of the water source.

Embodiments of the invention include flexible double-lined shells having an outer material 103 for resistance to environmental conditions and in inner material 105 made as a waterproof lining. In some aspects the outer and inner materials are the same. Note that in some embodiments a single lined piece of material can be used as long as it maintains its integrity during normal operating conditions.

In addition, the flexible shell is typically a durable waterproof material that can withstand sun and ultraviolet rays. Where the flexible shell is made from a double-lined material, the inner waterproof lining is typically constructed from polyvinyl chloride (PVC), low density polyethylene, and/or other like flexible food grade plastic(s) (or mixtures thereof).

In more detail, and in a first embodiment, a flexible shell 100 that defines an internal chamber 104 is shown in FIG. 1. The internal chamber 104 formed by the shell is in a cylindrical shape having a first end 106 for input of source water and a second end 108 for output for treated water. Note that other internal chamber designs can be varied, e.g., oval, square, rectangular and the like. Shape is determined by the flexible shell and various shapes are within the scope of the invention.

As illustrated in FIG. 1, the first end 106 of the shell can form a domed top 110 with an opening for receipt of the input water source (influent), and in some cases for receipt of a centrally located opening. Other first end shapes are contemplated to be within the scope of the present design, for example flat or sloped, although a domed first end is believed efficient for use in environments where materials may collect on the water treatment device, i.e., rainwater, snow, debris, and the like.

The opening in the first end can be of any shape and size, although one that minimizes exposure of the internal chamber from external debris is preferred. Also, the opening does not have to be centrally located, but is described as such to facilitate entry of an input water supply.

Between the first (Influent) and second (Effluent) ends of the internal chamber is an underdrain 112 for receipt and support of an amount of filter material. Underdrain 112 embodiments of the invention provide a permeable support for filter materials, having a sufficient level of durability and strength to support up to 6000 pounds of weight, e.g., 5000 pounds of filter material and 1000 pounds of water source. Note that other amounts are contemplated, based on the amount of water needed to be treated over any given period of time. A resealable cleanout opening 113 is provided for access through the shell and into the internal chamber. The resealable means can include a zipper connection, Velcro connection, snap configuration or other like connections.

In one embodiment the underdrain is composed of a sturdy but porous weight bearing material.

In an embodiment herein, the flexible shell 100 has a first end of about 5 to about 8 inches in height. The first end has a domed shape with a base of the dome being about 40-44 inches in diameter and a domed opening of about 2 to 4 inches in diameter and more typically about 3 inches in diameter.

A middle portion 114 of the flexible shell is approximately 70 to 75 inches in height and more typically about 73 inches in height. The diameter of the middle portion is the same as described for the first end. The second end of the flexible shell is approximately 7 to 9 inches in height, more typically 8 inches, also with a diameter that matches the first end and middle portion. The second end 108 has an inverted pyramid shape with an output opening of approximately 2 to 4 inches in diameter.

An underdrain 112 typically separates the middle portion of the flexible shell from the second end of the flexible shell. Underdrains are composed of durable material, including: certain durable cloth strips, plastic and/or metal mesh, mixtures of material types, and the like.

In other embodiments, a portable "bag" of filter natural is placed directly into the flexible shell and can provide both the underdrain and filter material. The bag can be fitted with a durable plastic liner and include up to 3 to 5 pounds or more of a filter material, e.g., sand, dry chemical powder, etc. The bag includes a zone (or opening) for accepting influent water and a zone (exit) for collecting the treated effluent water. Durable straps or other like materials can be used to secure the bag onto a support member. In this embodiment, the bag itself can replace the shell.

In all embodiments herein, the stagnant water above the filter material can be allowed to stand and form a Schmutzdecke 107.

Embodiments of the present invention further include methods for treating a water source in a remote or limited access area. Methods are directed at regions that have limited or no access to an energy supply or limited funds for use of an energy supply.

Aspects of the method include transport of a light weight water treatment device as described herein to a destination in need, support of the light weight water treatment device at the destination in need; loading of the water treatment device with a locally ascertainable filter material, for example sand; and treatment of the water source in the absence of energy need or input. In some aspects the treated water is stored for later use and can be further treated with chlorine or other like preventive antimicrobial material.

Methods herein include transport of one or more of (1) the flexible shell, (2) structural members and/or (3) filter material to a site in need of water source treatment. In one embodiment, transport of the flexible shell and up to a predetermined number of pounds of filter material is provided to a remote location in need thereof. Transport can include land, air and/or by sea. Also, in some embodiments, transport is through the United States Postal Service or other like service (Federal Express, etc).

In one method methods of the present invention provide up to 1.5 gallons of treated water per minute at a NTU (Nephelometric Turbidity Units) of one or less.

Water System Design

Although many water treatment systems are found in market, most have been introduced from the commercial point of view and for limited discharge capacity. These limited capacity water treatment systems are seldom from the perspective of an end-user. Most systems have limited capacity and are presumed to be used for treatment of drinking water alone. In fact this is even more dangerous than to using untreated water for every use. Drinking safe water is one of the components of the personal hygiene and can not assure alone in the absence of safe water for cooking, dish washing, bathing and even adequate hand washing. Therefore, the treatment device needs to be of the adequate capacity to produce the amount of water required for every domestic purpose, which are not always possible from those available in the general market. Indeed supply of adequate quantity of domestic water may become the better way to overcome most of the diseases related to water.

Where a basic service level to water has not been achieved hygiene can not be assured and consumption may be at risk. Though various basic service level standards may be established, an intermediate service level shown in Table 1 was considered reasonable and adopted as the basis of design for embodiments of the present invention. This particular invention of intermediate service level (average quantity about 50 liter per person per day) assumed to meet the basic demands required for consumption, hygiene, dish washing and bathing. In addition, a water treatment device or system of this invention is focused on addressing diseases related to water as mentioned in Table 1 above.

A field experienced daily water consumption pattern, Table 3 below, indicates that 25% of overall daily demand is consumed within a two hour period. That means that a device of the present invention must consider balancing reservoir with adequate capacity of production-consumption equalization. This provides an idea of a peak factor for calculating the size of distribution mains (if required) and size of the balancing reservoir considered as an integrated component of every water point in the present invention.

TABLE 3

Estimate of Daily Consumption Pattern of Rural Inhabitants

| Hours of a Day | Duration (Hours) | % of Daily Demand |
|---|---|---|
| 5.00 am-7.00 am | 2 | 25 |
| 7.00 am-12.00 noon | 5 | 35 |
| 12.00 noon-5.00 pm | 5 | 20 |
| 5.00 pm-7.00 pm | 2 | 20 |
| 7.00 pm-5.00 am | 10 | Negligible |

Design of water treatment devices of the invention requires, therefore, estimates of expected water demands applicable to the sizing of system pumping equipment or water delivery equipment, treatment facilities, transmission and distribution lines, and storage facilities. Estimating water demands (i.e., average day, maximum day, and peak hourly demands) to a rural, or other like, community may be complex and involves consideration of a number of factors such as: climatic influences; socioeconomic influences; cultural habits; pricing schedules; historic water uses for the development or the area; condition of the distribution system (quantity, quality, reliability, accessibility); and conservation practices.

Experience shows that in a general cost of the transmission and distribution system, in a typical rural water supply scheme, constitutes the bulk usually 80-90% of the construction cost. That is readily closer case for the large water supplies with centralized reservoir. Moreover, the majority of the pipe cost goes to the distribution pipes as they are over sized to cope with the peak hourly demands.

Use of the treatment system of this invention is presumed to be associated with production-consumption equalization tanks at each public water points that may play and important role to convert (undersize) the lengths of distribution mains to the principle of transmission mains carrying average daily demands. That in the run will compensate the costs of the treatment devices. The system such as is converted as decentralized one.

3. Water Supply systems based on Reservoir Locations

Storing filtered water is important at a slow sand filter plant for production consumption equalization.

a. Centralized Reservoir System.

Principally this system consists with only one reservoir for the entire system located above the highest elevation of the service area and equipped with break pressure chambers with float valves to control the static head.

b. Decentralized Reservoir system

In this system, several reservoirs are located in an appropriate elevations and closer to individual communities served. This system is equipped with distribution chambers to assure precise inflow to each reservoir and adequate interruption chambers overcome the static head issues.

This could prove a sustainable development in the drinking water supply sector and one can easily incorporate the treatment plants.

The treatment system of present invention is considered useful and appropriate to treat water from most of the following common water supply sources, for example:
1. Natural springs
2. Spring-fed Streams
3. Rivers
4. Lakes/Ponds
5. Groundwater (Tube wells & Dug Wells)
6. Rain Of the sources, springs, streams and groundwater are the most common sources of drinking water supplies in practice. Each of the sources can be adapted to the feed of water treatment device embodiments of the present invention.

Selection and Design of Water Treatment System:

Whatever water sources are used for domestic water supply, they require treatment process to overcome diseases related to water. The degree and type of treatment process may vary depending upon the selection of type of water source for the particular system.

Depending upon the geography and location there are two to four rainy seasons around the globe. Out of the surface water sources spring-fed streams, rivers lakes and ponds are different from that of the natural springs. The natural springs, to some extent may be categorized in the group of ground water artesian and tapped right from origin to eliminate the influence of rain flood. But the case is not that similar for remaining other surface water sources. Floods during the rain carries considerable amount of sediment loads and hence influence the watershed area where the water sources are belonging in the form of spring-fed streams, rivers, lakes and ponds.

In rural water supplies, selection of appropriate treatment system is a crucial part and is mainly governed by the type of the source water considered. The selection and design of appropriate treatment system is one of the major components of the drinking (domestic) water system. Cost of the water supply system depends on the treatment method adopted.

As such, a water treatment device should produce the water that can address the prevention of the diseases relater to water. The present invention is designed with due consideration and adequate attention to such factors.

As discussed previously, the domestic water sources can be broadly divided into (a) surface water and (b) ground water. The physical activity over the ground surface and the chemical contact throughout its flow path plays major role in the pollution of surface waters. Whereas the ground water sources have basically chemical contamination because the underground water flow through different chemicals and minerals.

Although there are many common situations, the treatment methods are guided by the particular water quality and are therefore case sensitive. However, with some exceptions, broadly, surface water treatment and groundwater treatment are the two major groups of treatment methods.

Though it is a seasonal case and depends on the geographical location and climatic condition, the surface waters are heavily loaded with sediments and other floating materials. The minimum treatment process the surface water requires is the screening, sedimentation and filtration, if disinfection is not affordable. However, filtration alone may be the demand of groundwater for basic domestic water quality. Filtration unit therefore can be considered as one of the common unit for both surface and ground water sources.

With the design and operation simplicity—as well as minimal power and chemical requirements—embodiments of the present invention remove suspended organic and inorganic matter. These filters also remove pathogenic organisms.

Water treatment devices of the invention reduce bacteria, cloudiness and organic levels—thus reducing the needs for disinfection byproducts in the finished water. Other advantages include:

Sludge handling problems are minimal;

Close operator supervision is not necessary;

Systems can make use of locally available material and labor; and

Local manufacturers may be encouraged to cast the embodiment with the regional production concept.

When embodiments of the present invention are used to treat surface water sources, that have widely varying turbidity levels, infiltration galleries, or roughing filters—such as horizontal flow gravel filters—may be used to reduce turbidity. This pre-step filtration helps to eliminate much of the sediments from the incoming feed and reduce clogging time of the water treatment device. Water treatment devices of the present invention are, however, less effective at removing microorganisms from very cold water, because as temperature decreases, the biological activities within the filter decline. Also water with very fine clays are not easily treated using slow sand filters.

Embodiments of the present invention consistently demonstrate their effectiveness in removing suspended particles with effluent turbidities below 1.00 Nephelometric Turbidity Unit (NTU), achieving 90-99%+reduction in bacteria and viruses, and providing virtually complete Giardia Lamblia cyst and Cryptosporidium Oocycts removal.

A typical treatment performance water treatment device is claimed to produce excellent treated water quality with the following removal capacity for the parameters herein.

| Water quality parameters | Removal Capacity |
|---|---|
| Turbidity | <1.00 NTU |
| Coliforms | 1-3 log units |
| Enteric Viruses | 2-3 log units |
| *Giardia* cysts | 2-4+ log units |
| *Cryptosporidium* Oocycts | >4 log units |
| Dissolved organic Carbons | <15-25% |
| Bio-degradable dissolved organic Carbons | <50% |
| Trihalomethane Precursors | <20-30% |
| Heavy metals (Zn, Cu, Cd, Pb) | >95-99% |
| Fe, Mn | >67% |
| As | >47% |

Water treatment devices of present invention are basically designed to work on the slow sand filtration principle. However, at present, the water treatment system of the present invention is limited in scope to purification of turbidity and microorganisms (Coliforms (total and fecal), Enteric Viruses, Giardia cysts and Cryptosporidium Oocycts).

It is estimated that, on average, households in developing countries pay only 35% of the cost of supplying water. The vast majorities of urban residents want in-house supplied water and are willing to pay the full cost. Yet, many countries have assumed that people can't afford to pay the full costs, and therefore they have used limited public funds to provide a poor service to a restricted number of people (WDR, 1992).

TABLE 4

Technical Data for Design of Water Treatment Devices:

| Design Parameters | Recommended range of Values |
|---|---|
| Filtration rate | 0.15 m³/m² * h (0.1-0.2 m³/m² * h) |
| Area per filter bed | 0.995 m² (~1.00 m²) |
| (For small community and or individual water supplies to ease manual filter cleaning) | |
| Number of filter beds: | One bed (Sand bed) |
| Depth of filter beds: | 1 m (minimum of 0.70 m of sand depth) |
| Filter media: | Effective size (ES) = 0.15-0.35 mm, Uniformity coefficient (UC) = 2.0 |
| Height of supernatant water: | 0.70-1.00 m (maximum of 1.50 m |
| Under drain system | |
| Circular plate/slab (generally no need for the further hydraulic calculations) A durable porous material, capable of supporting weight and allowing sufficient flow to meet demand | |

In the above scenario, public stand posts (a common water fetching location for predetermined number of households) may be the major consideration for the supply of domestic water for the rural inhabitants in the developing countries. As discussed before, this is neither the point of use nor the point of entry. Although it is not hard and fast, the rural settlement pattern seldom has peculiarity.

The operation and maintenance responsibility of water treatment device of the invention will be undertaken by the particular users group and none of the plant will affect the other in the system. As the particular interest group will be considerably small, the management problem can be considered to be minimized compared with the bigger group.

With the basic access, average quantity of water at the outlet of the water treatment device of the invention is unlikely to decrease 50 liters per person per day, a water point (public stand post) within a distance between 100 and 1000 m or 5 to 30 minutes total collection time, one may expect to serve in a range of 50-70 people. The average daily demand (based on the 50l/c/d) results in between 2500-3500 Liters per day. That comes to be 0.1458 cubic meters per hour on the higher side.

It is reported that a slow sand filtration system with sand bed with effective size of 0.15-0.35 mm and uniformity coefficient 2.00 can produce 0.10-0.20 m3/m2*h. The treatment system of present invention is designed following these assumptions. The sizing of the housing of the system is calculated to match the upper limit of the required demand.

If we consider a cylindrical housing for the water treatment device of invention, the diameter requirement to acquire about one square meters of filter bed (Table 4) surface area can be obtained from the diameter of 1130 millimeters.

Construction of a Water Treatment Device of the Invention

One embodiment of a water treatment device comprises the following components:

| | |
|---|---|
| Housing | lightweight and flexible |
| Water layer | Maintained through controlling devices |
| Filter bed | locally available |
| Drainage system | can be manufactured (preferably pre-casted) |
| Flow control | mechanisms can be developed with purchased parts from the local market |

In the case of surface water feed, addition of pretreatment methods such as screening, sedimentation or roughing filter units should be included. Depending upon the geographic location the number of rainy seasons and intensity of rainfall may vary. The amount of impurities in the surface water (during rainy/flood period) depends on the topography as well as the geological formation and vegetation in the water shed area.

Community Involvement:

Community involvement is essential for development of a device of the invention to secure successful implementation and future maintenance. However, for rural water supply schemes, community involvement is essential on at least following three major counts:

To ensure commitment for use of the scheme;

To mobilize local resources in terms of manpower, goods and services; and

To ensure sound arrangements system is instituted for long term maintenance.

Water treatment devices of the invention provide simple and reliable processes in reducing bacteria, cloudiness, and organic levels. These devices are relatively inexpensive to build.

In the most basic sense, untreated water (from one of the above described source) percolates slowly through a bed of porous sand (or other like material) having predetermined sizes and uniformity coefficient for the predetermined quantity and quality of effluent. The untreated water is introduced over the surface of the sand (filter media) in a manner to minimize turbulent of the stagnant water and then gravity drains the treated water for the bottom.

Embodiment of the invention generally include a housing unit, stagnant water zone, a filter bed (sand or other like material), a system of under drain to collect the treated water, water inlet piping mechanism and a outflow mechanism with flow regulating and flow measuring devices to control the filtration rate. No chemicals are added and/or needed to aid the filtration process.

The water treatment devices of the invention are extremely beneficial for removing suspended organic and inorganic matter. These devices can be designed for various capacities and are designed and operated simply, as well as with minimal power and chemical requirements.

As no chemicals are added and/or needed to aid the treatment process, presence of disinfection byproducts in the finished water is minimal as the process reduces the need for disinfection. Moreover, the devices can be fabricated in the local level from locally available materials and labor. One important side of this invention is no need of close operator supervision and minimal problem in sludge handling.

A typical embodiment of the invention appears in FIG. 1. The raw or untreated water, i.e., feed, flows into the upper tank region in such a manner as to avoid disturbing the Schmutzdecke; flows near the surface of stagnant water should be very gentle, which can be managed through the development of free flow system in the influent pipe. The water in this compartment will be about 1.00-1.25 meter depth that will drive through the Schmutzdecke, the filter bed and into the support gravel.

"Schmutzdecke" is a complex biological layer formed on the surface of a slow sand filter. The Schmutzdecke is the layer that provides the effective purification in potable water treatment, the underlying sand providing the support medium for this biological treatment layer.

The composition of any particular Schmutzdecke varies, but will typically consist of a gelatinous biofilm matrix of bacteria, fungi, protozoa, rotifera and a range of aquatic insect larvae.

One aspect of the water treatment device of the invention is setting the parameters—such as the plant filtration rate, bed depth, and sand size. Embodiments of the invention consistently considered their effectiveness in removing suspended particles with effluent turbidities below 1.0 nephelometric turbidity units (NTU), achieving 90-99+ percent reductions in bacteria and viruses, and providing virtually complete Giardia lamblia cyst and Cryptosporidium oocyst removal.

Though preferable turbidity level in the influent to be applied in the present treatment system of present invention comes down to 10.00 NTU, turbidity levels lower than 20 NTU are supposed to be directly applied to embodiments of the invention without pretreatment steps. However, water with turbidity levels higher than 20 NTU require pretreatment. For example, a roughing filter can be including in the device to remove suspended matters, causing turbidity levels higher than 20 NTU to lessen. The following list provides the specification of one embodiment of the present invention:

Illustrative Specification of Filter Unit:
1. Filter System:
Filtration rate 0.13 m$^3$/m$^2$*h (130 lt/m$^2$*h)
Area of filter bed 0.991 m$^2$ (in community water point to ease manual filter cleaning)
Number of filter beds One bed (Sand bed)
Depth of filter bed 1.00 m
Filter media (Sand) Effective size (ES)=0.15-0.35 mm; UC=2.00
(or equivalent commercially grade material capable of achieving water quality parameters)
Height of supernatant water 1.00 meters 2. General Description Filter Housing:
As noted in FIG. 1, embodiments of the invention include a flexible intermediate bulk container (FIBC) or shell made from, for example, a food grade waterproof material or lined with a form fitting PVC or other waterproof, food grade liner material. This shell can include four or more top hanging straps 109, although the weight of a full FIBC will be borne at the bottom of the FBIC. (Emphasis added)

One illustrative embodiment includes the following features:
1. Inside load of 5 psi-max.
2. Main FIBC is 42 inches square by 73 inches high.
3. Top of FBIC is "domed" including a 3 inch (¾" diameter hole on influent and effluent) diameter hole (for a compression fitting—by others) See hole detail on sketch.
4. Bottom of FIBC is an upside down pyramid including a 3 inch diameter hole (for a compression fitting—by others) See hole detail on sketch.
5. FIBC to include a "cleanout zipper" or cleanout porthole. Includes four standard FBIC hanging straps.

The filter material is supported by a durable porous material capable of supporting entire weight of media and water. For illustrative purposes, embodiments described here in were used to treat a water supply over a course of approximately 23 days. Table 5 shows one instance of the present invention's utility during this period. Note the effluent NTU level during this time frame.

TABLE 5

Representative Data on Turbidity

| Date | Flow Rate gpm | Turbidity NTU Influent | Turbidity NTU Effluent | Sampler |
|---|---|---|---|---|
| Sep. 25, 2007 | 0.85 | 2.85 | 0.78 | Mgeho |
| Oct. 6, 2007 | 0.65 | 4.78 | 0.82 | Mgeho |
| Oct. 8, 2007 | 0.65 | 1.48 | 0.52 | Mgeho |
| Oct. 9, 2007 | 0.65 | 2.76 | 0.59 | Mgeho |

TABLE 5-continued

Representative Data on Turbidity

| Date | Flow Rate gpm | Turbidity NTU Influent | Turbidity NTU Effluent | Sampler |
|---|---|---|---|---|
| Oct. 17, 2007 | 0.65 | 4.33 | 0.43 | Mgeho |
| Oct. 18, 2007 | 0.65 | 7.01 | 0.43 | Mgeho |

4. Flow Control Device:
A flow regulating valve 111 (Ø25 mm Globe valve) can be fitted at the outlet pipe 113 to regulate the effluent discharge rate. A flow regulating device (Ø25 mm diameter rotometer type) will be fitted following the control device to monitor the effluent discharge rate. The effluent flow rate will be specified in terms of liters/hour per unit area of the filter media in the question. Maintaining the constant level of stagnant water above the filter bed is important for maintaining an even filtration rate. The flow rate will drop off with the build-up of material on the surface of the filter bed. An open clear pipe fixed to the exterior of the filter may be adopted to monitor head loss.

5. Pretreatment:
High turbidity levels in the feed water will prematurely block the slow sand filters, leading to a much shortened time span between cleanings and an overall deterioration of the water quality. High turbidity in the feed may shorten the device's life from several months to a matter of days. This would be obvious during the rainy days of the year in the case of treatment of river waters. When water treatment devices are used to treat surface waters that have widely varying turbidity levels, infiltration galleries or rough filters may be used to reduce turbidity. In the case of use of river water as a domestic water source, the Horizontal Flow Roughing Filter is a very effective means of pre-treating the raw water to reduce the turbidity to acceptable levels prior to entry into the device of the present invention.

If river water turbidity is around 20 NTU or less, except at certain periods (rainy days) of the year, a horizontal flow roughing filter (HRF) could be by-passed most of the year and brought on-line during these periods. Other means of turbidity reduction include holding ponds and sedimentation tanks may also be equally efficient. But adoption of HRF is considered better option and more advantageous because of its simplicity in construction and operation. The HRF can be designed as a common centralized water pre-treatment component and will be located as closer as possible to the intake. The capacity of the HRF will hence be governed by the size of the water system (design flow) and the level of turbidity in the effluent and hence will be system specific.

Storage of Clear Water:
In the traditional water supply systems with centralized reservoir, a single unit slow sand filter has been in practice which requires a large land area, massive quantities of filter media and huge numbers of manual labor for cleaning. Because of this limitations size of the filter units are optimized to complement the average daily demand. However, the decentralized reservoir water distribution system will divide the resources to individual settlements and hence enhances the better management of available resources.

As discussed previously, most of the rural communities have a daily consumption of water of 25% of overall daily demand within two hours. That means we it is obvious to consider a balancing reservoir to meet the peak hour demand. In other words, storage is needed for production consumption equalization. Hence embodiment of the invention sought balancing reservoir(s) to meet the peak hour demand. In other words, storage is required for production and demand equalization. In this case the capacity of embodiment can be optimized to match the average daily flow contributing to the reduction of size of transmission pipes and hence the overall project cost.

Clean or treated water storage units are desirable to be located as close as feasible to the water treatment devices. A typical amount of treated water storage should be tentatively 35-40% of the daily water demand. However, the water treatment system should be incorporated as one of the component of the water distribution system. As the devices are proposed to be installed community wise and to serve a fixed number of users, the storage unit is desirable to be equipped with water drawing facilities. The additional construction works to facilitate the services will be location and geography specific. So it will be decided by the concerned project engineer. Likely contamination of treated water during transportation form treatment unit to storage facilities can be minimized by reducing the distance between them. There will not be any cost of distribution pipe line if public water drawing facilities are united with storage tanks.

The treatment devices of the invention are conceptualized as the point of entry (POE) water treatment system. The consumers will have to fetch the treated water in home for use, i.e., consumption, cooking and dish washing requirements. But the system can be considered as the point of use in the perspective of their use for the personnel hygiene activities such as bathing and hand washings. Therefore this system may be considered as combination of both POE and POU.

Embodiment of the invention provide a solution of domestic water purification solution to rural communities and individual water supplies unable to afford the procurement of appropriate and more conventional water treatment or filtration system. The present invention sought after utilize local materials easily available at most rural sites.

The present invention is aimed to be expanded to most of the rural communities who are facing the problem of access to safe domestic water. Gradually a mechanism will be established so that fabrication and assembling of invention housing and other parts will be carried out by local manufacturers. Which will give lower unit cost of the embodiment at local market at local currency and it will promote the employment as well as skill development opportunities in the local level to some extent and promote the local economic condition Pilot Testing:

In one embodiment of the present invention, site-specific pilot testing is performed to understand the system and whether it is sufficient to allow engineers to predict what treated water turbidity an operating treatment of the present invention will attain. Piloting of these pilot systems are not expensive. Pilot test units can be constructed from locally available materials and other suitable prefabricated pipe and accessories products As such, in one aspect of the invention, embodiments are designed to provide treated water to a small village/tribe, designed with inexpensive and universally available parts to provide the cost effective solution for underdeveloped nations, small enough to be used in a remote location, i.e., can be portable or parts to build invention are easily transportable, and is effective as a stand alone unit or as a component of a larger water distribution system. No other water treatment unit available can make these combined claims.

Community Participation:

Community involvement is a vital importance for successful implementation and proper operation and maintenance of the systems. Until the community is prepared to accept the system it is too early to implement. For rural water supply schemes, community involvement is further essential on at least three counts;

To ensure commitment to use of the scheme

To mobilize village resources in terms of manpower, goods and services; and

To ensure that sound arrangements can be instituted for long term operation & maintenance The treatment system of present invention is uniquely engineered. Major components of the system will be fabricated and assembled in combination of best specific accessories.

The treatment system of present invention is supposed to work as a corner stone to support the UN millennium goal in the drinking water sector.

The water treatment system of present invention is the combination of point of entry and point of use of domestic water.

Applicable turbidity level of influent in the treatment system of present invention is recommended 20 NTU or less. Additional turbidity reductions are desired to be incorporated for source waters exceeding these turbidity limits Presence of pathogenic organisms is far more a frequent problem in developing countries. Therefore, this invention will address only with water for bacteriological safety and not chemical safety.

The water treatment system of present invention is based on slow sand filter water treatment principle. The system usually functions without chemical pre-treatment, such as chlorination or flocculation.

The system is desired to be incorporated as one of the components of the water distribution system with considerable modifications in the design of distribution system in present practice. Incorporation of water treatment system of present invention may result minimal or no additional cost to the overall system.

No need of highly skilled manpower for its operation, no need of chemicals and energy in treating water and application of local materials are the specialties of the present invention.

For embodiments of the present invention, it will be clear that the invention is well adapted to address and attain the end and advantage mentioned as well as those inherent therein. While a presently preferred embodiment has been described for purposes of this disclosure, various changes and modifications may be made which are well within the scope of this invention. Numerous other changes may be made which will readily suggest themselves to those skilled in the art and which are encompassed in the sprit of the invention disclosed herein and as defined in the appended claims.

What is claimed is:

1. A portable water treatment device comprising:
  (i) a flexible shell comprising a Flexible Intermediate Bulk Container outer shell and a plastic inner liner, wherein the Flexible Intermediate Bulk Container outer shell and the plastic inner liner together define an internal chamber, the internal chamber having a first end for influent of a water source and a second end for effluent of treated water;
  (ii) a porous underdrain positioned within the internal chamber between the first end of the internal chamber and the second end of the internal chamber and dividing the internal chamber into two portions;
  (iii) a filter bed comprising sand, wherein the filter bed is supported within the internal chamber between the first end of the internal chamber and the porous underdrain, wherein the filter bed is constrained by the flexible shell and wherein the filter bed has an upper surface area opposite the porous underdrain of about 1.00 m², and wherein the filter bed has a depth of greater than or equal to 0.70 m;

(iv) a flow control device in fluid communication with the second end of the internal chamber, the flow control device providing for an exit flow rate of 0.1 to 0.2 m³/m²*hour for water exiting the second end of the internal chamber after entering the internal chamber at the first end and flowing through the filter bed and porous; and (v) a Schmutzdecke formed within the flexible shell on or within the filter bed opposite the porous underdrain wherein the Schmutzdecke and filter bed cooperate to provide for filtration of influent water having a turbidity of equal to or less than 10.00 NTU to an effluent turbidity after the Schmutzdecke and filter bed of less than 1.00 NTU.

2. The portable water treatment device of claim 1 further comprising a structural support for attachment of the flexible shell wherein the flexible shell hangs from the support and wherein water from the water source flows by gravity from the first end through the internal chamber and out the second end.

3. The portable water treatment device of claim 1 wherein the flexible shell is attached to the structural support by a series of three (3) or more durable straps and/or supports.

4. The portable water treatment device of claim 1 wherein the first end of the flexible shell has a domed shape with a centrally located opening water source input and a inverted pyramid shaped second end for collection of treated water exiting from the second end of the water treatment device.

5. The device of claim 1, wherein the sand is present in filter bed in a quantity of from 3500 pounds to 4500 pounds.

6. The device of claim 1 wherein the Schmutzdecke and filter bed cooperate to filter influent water and together provide for effluent water having at least 90% fewer bacteria and viruses than the water of the water source.

7. The device of claim 1 further comprising a pre-treatment filter in fluid communication with the water source and the first end of the internal chamber wherein the pre-treatment filter provides for influent water having a turbidity of greater than 10.00 NTU to be filtered to a reduced turbidity of 10.00 NTU or less prior to flowing into the first end of the internal chamber.

8. The device of claim 7 wherein the pre-treatment filter comprises a horizontal flow roughing filter.

9. A method for supplying treated water to a rural community comprising:

(a) providing a water source located in the rural community, wherein the water source comprises water having a turbidity of 10 NTU or less;

(b) providing a portable water treatment device comprising:

(i) a flexible shell comprising a Flexible Intermediate Bulk Container outer shell and a plastic inner liner, wherein the Flexible Intermediate Bulk Container outer shell and the plastic inner liner together define an internal chamber, the internal chamber having a first end for influent from the water source and a second end for effluent of treated water;

(ii) a porous underdrain positioned within the internal chamber between the first end of the internal chamber and the second end of the internal chamber and dividing the internal chamber into two portions;

(iii) a filter bed comprising sand, wherein the filter bed is supported within the internal chamber between the first end of the internal chamber and the porous underdrain, wherein the filter bed is constrained by the flexible shell and wherein the filter bed has an upper surface area opposite the porous underdrain of about 1.00 m², and wherein the filter bed has a depth of greater than or equal to 0.70 m;

(iv) a flow control device in fluid communication with the second end of the internal chamber; and (v) a Schmutzdecke formed within the flexible shell on or within the filter bed opposite the porous underdrain;

(c) flowing water from the water source into the first end if the internal chamber of the water treatment device, through the Schmutzdecke, filter bed and porous underdrain to the second end of the internal chamber of the water treatment device while controlling the flow rate of the water to be a flow rate of 0.1 to 0.2 m³/m²*hour and limiting the turbulence of the water source as it enters the water treatment device to cause filtration of the water from the water source by the filter bed and Schmutzdecke; wherein the filtered water has an effluent turbidity after the Schmutzdecke and filter bed of less than 1.00 NTU; and (d) storing a portion of the treated water in a water storage means.

10. The method of claim 9 wherein the rural community water source is a surface water source, a collected rain water source, or an untreated ground water source.

11. The method of claim 9 wherein the treated water stored in the water storage means has a has at least 90% fewer bacteria and viruses than the water of the water source.

12. The method of claim 9, wherein the sand is present in the filter bed in a quantity of from 3500 pounds to 4500 pounds.

13. The method of claim 9 further comprising pre-treating the water from the water source with a pre-treatment filter to reduce the turbidity of the water entering the first end of the internal chamber of the water treatment device to 10.00 NTU or less.

14. The method of claim 13 wherein the pre-treatment filter comprises a horizontal flow roughing filter.

* * * * *